Feb. 11, 1969   E. K. KINTNER   3,426,799
AUTOMATIC VALVE

Filed Oct. 7, 1964

INVENTOR.
EDWIN K. KINTNER
BY
*William J. Ruano*
his ATTORNEY

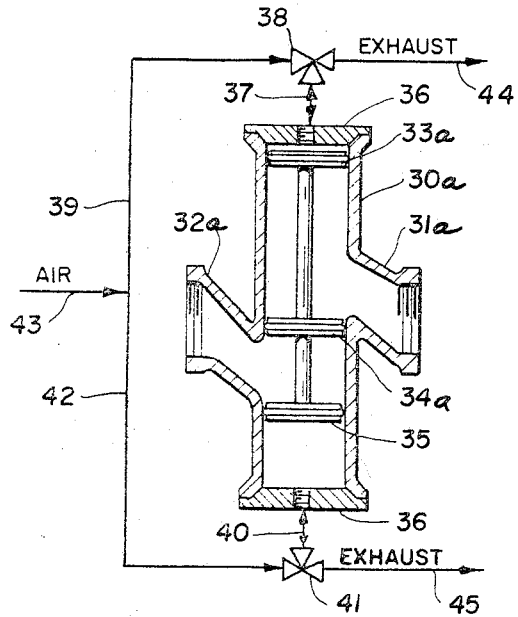
Fig.4.
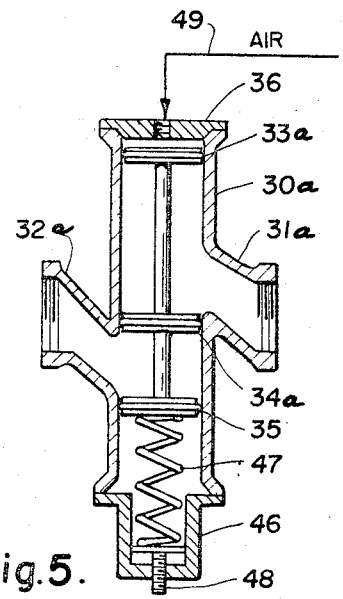
Fig.5.
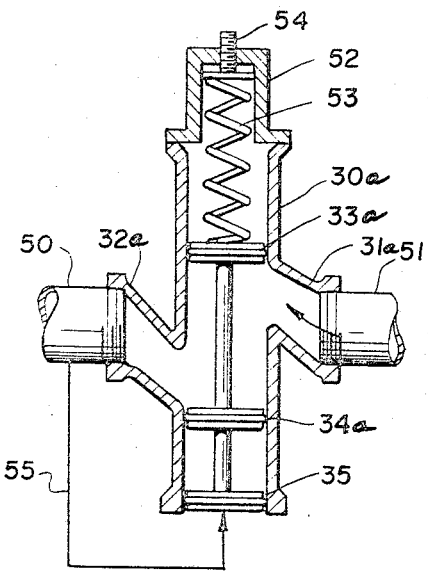
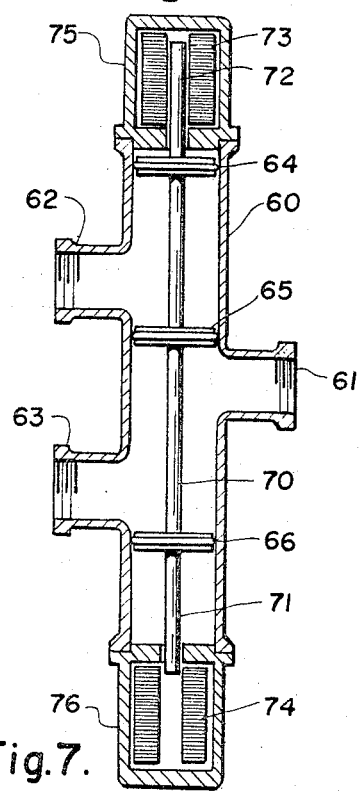
Fig.7.
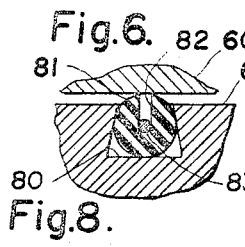
Fig.8.
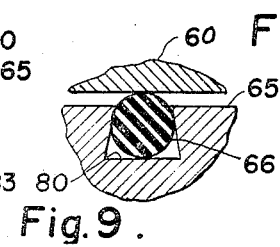
Fig.9.
INVENTOR.
Edwin K. Kintner United States Patent Office 3,426,799
Patented Feb. 11, 1969

3,426,799
AUTOMATIC VALVE
Edwin K. Kintner, Pittsburgh, Pa., assignor to Kinwell Development Company, Johnstown, Pa.
Filed Oct. 7, 1964, Ser. No. 402,099
U.S. Cl. 137—625.48         3 Claims
Int. Cl. F16k 11/07, 31/143, 3/22

This invention relates to a valve and, more particularly, to an automatic valve so designed as to provide a balanced piston which can be moved by application of extremely small pressures to operate the valve.

An outstanding disadvantage of conventional valves is that they involve expensive parts, such as stuffing boxes, motors, costly stems, and unreliable seats and diaphragms which have to be forced against high line pressure.

Another disadvantage is that because of the requirement of numerous parts, such valves require constant and expensive maintenance and are not truly reliable for automatic operation in control systems.

An object of the present invention is to provide an automatic valve which overcomes the above-named disadvantages of conventional valves and which eliminates the aforesaid expensive parts, such as stuffing boxes, motors, expensive stems, etc.

Another object of the present invention is to provide a valve which does not require overcoming of line pressure, which is usually high, and its attendant difficulties in maintaining the seal against such pressure and which, instead, may be moved by extremely small pressures provided either by the fluid flowing through the valve or by an external control fluid, such as air.

Other objects and advantages will become more apparent from a study of the following description taken with the accompanying drawings wherein:

FIG. 4 shows an air-operated valve, embodying the present invention, controlled by two 3-way petcocks;

FIG. 5 shows an air-operated valve controlled by air;

FIG. 6 shows a regulating valve operated by downstream pressure;

FIG. 7 is a valve operated by electric solenoids;

FIG. 8 is an enlarged, fragmentary, cross-sectional view of the O-ring and dove-tail groove;

FIG. 9 is a preferred modification of the O-ring and dove-tail groove, as shown in FIGS. 1, 2 and remaining figures illustrating the valve.

Figure 1:
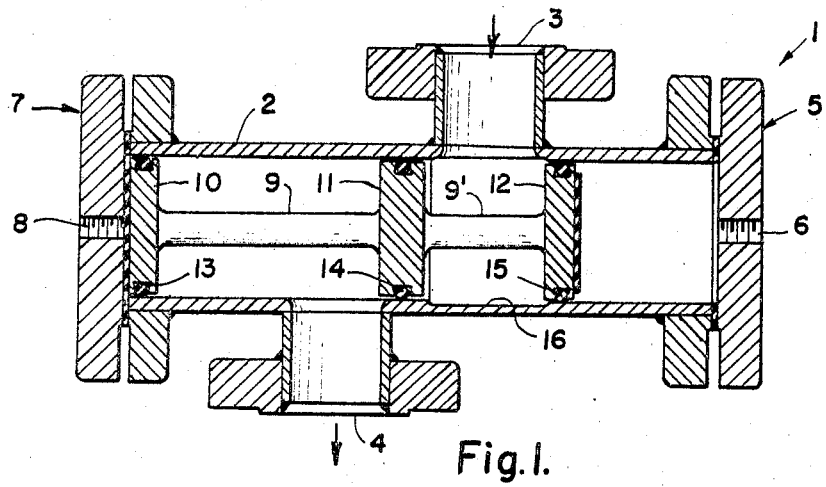
FIG. 1 is a longitudinal, cross-sectional view of an "on-off" valve embodying the present invention and shown in the closed position.
Figure 2:
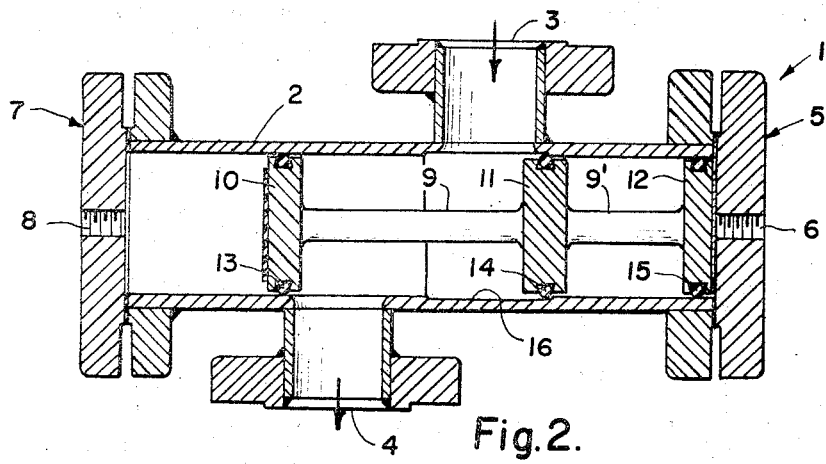
FIG. 2 is a view similar to FIG. 1 but showing the valve in the open position.

Referring more particularly to FIGS. 1 and 2 of the drawing, numeral 1 generally denotes an "on-off" valve embodying the principles of the present invention and comprising a valve body 2 of substantially cylindrical configuration and provided with an inlet port 3 and an outlet port 4. These ports are staggered and located on diametrically opposite portions of the valve body. The valve also includes end covers or rings 5 and 7 provided with threaded openings 6 and 8, respectively, at their centers, into which the threaded tubes may be screw threaded for introducing fluid under pressure, such as liquid or air.

An important feature of this invention is the construction of the piston assembly which includes piston rods 9 and 9′ integrally secured to pistons 10, 11 and 12. More particularly, the invention resides in the aforesaid piston assembly and the floating O-rings or sealing rings of rubber, such as, Buna rubber or other suitable stretchable material, such as 13, 14 and 15, which are fitted in dove-tail grooves which extend circularly about the perimeter of the respective pistons. The dove-tailed groove 80 is more clearly shown in FIG. 9, in which groove the O-ring 66 is seated, which O-ring has a portion thereof which projects radially outwardly of the outer surface 65 of the piston so as to form a seal with the inner surface of the valve body or cylinder 60.

A particularly important feature of the invention resides in the provision of an undercut or recessed portion 16 along the entire perimeter of the inner surface of valve body 2 in confronting relationship with inlet opening 3. Such recessed portion 16 permits uniform expansion, throughout its entire perimeter, of the O-ring 14 as piston 11 traverses across the space defined by recess 16 and thereby eliminates the tendency of the O-ring to bunch, that is, to project radially outwardly of only that portion of the dove-tail groove exposed to the inlet as would otherwise occur without undercut 16.

Such bunching generally causes cutting or wearing off of the bunched portion as it moves to the position shown in FIG. 2, that is, past undercut 16. The pressure of the incoming liquid concentrates on such bunched portion and tends to further unseat it so as to further aggravate the above-mentioned danger of abnormal cutting or wear.

The dove-tail groove 80, as shown in FIG. 9, is preferably slightly greater in diameter than the inner diameter of the O-ring, perhaps 3/8″ greater, so as to require stretching of the O-ring to seat it in the dove-tail groove and so that the O-ring will always be under tension even when in the groove as shown in FIG. 9. The clearance between the outer surface 65 of the piston and the inner surface 60 of the valve body should be less than .003 inch and the O-ring should be up to about 90 durometer hardness so as to seal up to 5000 lbs. per square inch. The normal durometer of 70 for conventional valves is effective to seal only up to about 1500 lbs. per square inch. Thus the present O-ring enables operation of the valve at considerably higher fluid pressures and provides an assured seal having abnormally long life. Furthermore, it enables the use of considerably larger O-rings, up to 1½″ in cross-section as compared to only ¼″ in a comparable size conventional valve. This arises partly because of the abnormally large effort to stretch such large size O-ring to seat it in the groove. Correspondingly great effort is required to unseat the valve from the groove, therefore minimum wear of the ring will occur from shearing action against the inner surface of the valve body. Also it eliminates line shock.

In operation, the O-ring actually "floats" radially outwardly as it moves from the position shown in FIG. 1 to that shown in FIG. 2 since the stretched O-ring leaves its seating position during such movement as it slides across the recessed area 16 in the flow stream. Line pressures immediately encapsulate the O-ring. This action prevents extrusion and harmful bunching while allowing the flexible O-ring to adjust to its new environment.

Figure 3:
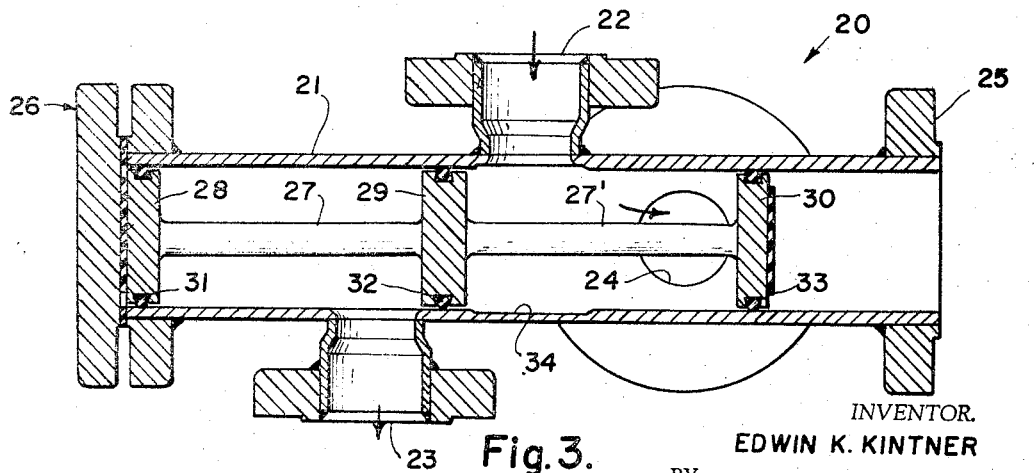
FIG. 3 is a longitudinal, cross-sectional view of a diversion type valve embodying the present invention.

FIG. 3 shows a diversion type valve, generally denoted by numeral 20, embodying the present invention and comprising a valve body 21, inlet opening 22, outlet opening 23 and an additional outlet port 24 at 90° from openings 22 and 23. The valve has an end ring 25 and an end cover 26 the latter sealingly closing the end of the cylinder which encloses a piston assembly comprising piston rods 27 and 27′ integrally connected to pistons 28, 29 and 30 provided with floating O-rings 31, 32 and 33 contained in dove-tail grooves and being essentially of the construction shown in FIG. 9.

A modification of the groove and ring construction is shown in FIG. 8 wherein the O-ring 81 is provided with an outer peripheral slot 82 into which is slid a band such as one of wire 83, or perhaps a band of suitable stretchable material, for tightly holding the O-ring in seated position. Slot 82 may be filled with cement or other filler to totally enclose band 83.

Referring more particularly to FIG. 4 of the drawing, numeral 30a denotes an "on-off" valve having inlet and outlet ports 31a and 32a and a valve stem to which are integrally secured, in spaced relationship, three pistons 33a, 34a and 35 with suitable rings, as described in FIGS. 1 and 2, for forming a liquid-tight seal with the cylindrical portion of the wall of valve 30a. End caps or closure members 36 are provided having threaded openings into which threaded tubes may be screw threaded for introducing air under low pressure against the outside faces of the end pistons 33a and 35. As shown by arrows 37 and 40, low pressure air coming from any suitable source 43, and flowing through lines 39 and 42, may be selectively applied to either of the end pistons by means of three-way cock valves 38 and 41. Thus by turning one cock valve so as to exhaust air through exhaust outlet 44 or 45 to bleed to atmosphere, and by applying air to the other side of the valve, that is, to the opposite piston, the valve stem may be moved to change the position of the valve from open to closed, or vice-versa.

More specifically, the valve is shown in the closed position. To open it, it would be necessary merely to introduce air from the three-way cock valve 38 to apply pressure to the piston 33a to move the valve downwardly while exhausting air through the cock valve 41 through exhaust 45. As the stem moves downwardly, piston 34a will move to the position formerly occupied by piston 35 so as to fully open the valve and permit liquid or other fluid to flow between ports 31a and 32a.

Instead of operating the three-way clock valves 38 and 41 by hand, they may be operated electrically or magnetically.

Valves may be operated by the product flowing through the valves. Here advantage is taken of the low pressure to move the piston. These inlets and outlets are each connected with a small three-way cock valve so that by changing the position of the cocks, the valves may be opened or closed.

FIG. 5 shows a modification of the valve 30a wherein a light return spring 47 is provided at one end which applies pressure against the lowermost piston 35. The tension of the spring may be adjusted by turning adjusting screw 48 contained within the end cap 46. Air may be introduced through inlet 49, such as by the use of a three-way cock valve (not shown) so as to force piston 33a downwardly against the action of spring 47 so that piston 34a will move from the closed position, shown, to the position presently occupied by piston 35 so as to open the valve and permit flow between ports 31a and 32a. Of course, when air is bled from the space above piston 33a, spring 47 will return the valve to the closed position, shown.

It should be understood that air is applied to the valve from air-operated temperature controls, air-operated level controls, or air positioning valves. Air may also be directed to these valves through small three-way valves for opening or closing at remote positions.

The valves work equally well by the liquid product flowing therethrough and may be operated either by hand or electrically, such as by the three-way solenoid shown in FIG. 7.

The valve has many and varied uses, such as a check valve on a boiler feed pump to shut the valve off as soon as the feed pump stops, thus eliminating steam vapors from entering the pump. Before or after a pump, valves fed by the line will turn on or off as the motor starts or stops. The valve may close a steam line in response to abnormal pressure drop or abnormal pressure increase. Or the valve may recirculate the product when the flow gets too low.

FIG. 6 shows a further modification of the valve for use in regulating pressure. A spring 53 is provided which serves as a return spring and whose tension is adjusted by turning of an adjusting screw 54. The valve may be used for reducing presures, such as from 1000 lbs. to 20 lbs. per square inch. The equal area of the end piston along with the balanced piston makes it very easy for the downstream side of the valve to control the position of the seal. Of almost equal importance is the fact that, unlike conventional valves that open the entire annuli when positioning, the present valve uses the side of the piston to regulate the flow by cooperating with the circular opening of inlet and outlet ports 31a and 32a which provide a gradual change of area.

FIG. 7 shows a three-way valve 60 provided with an inlet port 61, and outlet ports 62 and 63 (or vice versa) and wherein the stem 70 has integrally secured thereto three pistons 64, 65 and 66, of the construction described in FIG. 3, which may be moved by attracting magnetic cores 71 and 72 by selectively energizing solenoid coils 73 and 74 contained within end caps 75 and 76, respectively. These solenoids may provide a push of about 5 lbs. or so to either end of the valve to effect opening or closing. They are suitable for pressure of 2000 lbs. per square inch and are particularly useful when a fast inflow of water to a butterfly valve is desired, or when using crude oil to regulate other valves, or when there is a need for an inrush of air in sterilizing or processing systems. Such valve is one of the simplest solenoid valves yet devised with full-flow and trouble-free seals. Instead of three-way operation, as shown, the valve may be a two-way valve.

The valves of the present invention are suitable for a wide variety of automatic control uses. For example, such valves may be installed to change, stop or regulate flow. All of these operations can be done from a control point as well as at the location of the valve. Such valves are virtually trouble-free and fully automatic, they may operate conventional switches, such as micro-switches, according to automation needs.

Such automation is not only applicable to processing, but is equally applicable to controlling oil flow through pipe lines; chilled water in air-conditioning systems; water flow in city and plant lines, steam flow in city and plant lines; gas flows, such as ammonia, freon, or oxygen from converters to final usage, sewer lines, vacuum lines, air lines, and hydraulic lines. In every automatic system, some hand valves are used to completely shut lines, such as the suction and discharge valves on an ammonia compressor. Here the quick opening, leak-proof, hand valve is of great benefit to plant operators.

It should be noted that the modification shown in FIGS. 4, 5, 6 and 7 may all be provided with recesses or undercuts such as 16 shown in FIGS. 1 and 2 or 34 shown in FIG. 3. Furthermore, these modifications may all include O-rings seated in undercut or dove-tail grooves such as shown in FIG. 9 (or FIG. 8).

It should be further noted that the valves shown in FIGS. 1, 2 and 3 may be operated either manually or by pneumatic or electro-magnetic means such as shown in FIGS. 4, 5 and 7.

Thus it will be seen that I have provided an efficient and novel valve having a balanced piston which may be operated by insignificantly small pressures, which valve is of relative simple and inexpensive construction, being devoid of cumbersome and expensive parts, such as stuffing boxes, motors, etc., and which can be operated either by hand or electrically and by either line pressure or auxiliary air or other fluid under low pressure, as desired; furthermore, I have provided a valve which is excellently suited for automatic operation and which is practically trouble-free, requiring practically no maintenance and which is virtually fool-proof and which has long life such as heretofore not attained by other valves.

While I have illustrated and described several embodiments of my invention, it will be understood that these are by way of illustration only, and that various changes and modifications may be made within the contemplation of my invention and within the scope of the following claims.

I claim:
1. A valve for controlling high volume flow of liquid under high pressure comprising a cylindrical valve body having an inlet opening at the side thereof of a diameter of at least ⅓ of that of the valve body and having a correspondingly sized, longitudinally spaced, outlet opening, a valve stem, coaxially disposed in said valve body, having three longitudinally spaced pistons rigidly secured thereto having diameters several times that of said valve stem, the intermediate piston having a peripherally extending grooved seat, an O-ring having a cross-section of about one inch in diameter of a material of about 90 durometer hardness under tension while in said seat and projecting beyond the perimeter of said intermediate piston to form a liquid-tight seal with said valve body, said intermediate piston and O-ring being movable across the entire width of only said inlet opening against the high incoming pressure thereof so as to become confined against expansion and thus prevent abnormal wear thereof as a consequence of such movement, said intermediate piston cooperating with a seat formed on the inner wall of said valve body between said outlet and inlet openings to control the flow therethrough, said intermediate piston being spaced from one of said other pistons by a distance substantially the same but greater than the width of said inlet opening and being logitudinally movable by said stem to a position beyond said inlet opening to permit maximum flow through said inlet and outlet openings, and means for selectively introducing fluid under pressure between another of said pistons and the end wall of said valve body to effect said movement of said valve stem.

2. A valve as recited in claim 1 together with a recess in the inner wall of said valve body confronting and extending across the entire width of said inlet opening to permit uniform, radially outward expansion of said O-ring from said intermediate piston as it moves across said inlet opening.

3. A valve as recited in claim 1 together with means for selectively introducing fluid under pressure between the third of said pistons and the opposite end wall to selectively move said stem in opposite directions.

References Cited

UNITED STATES PATENTS

| | | | |
|---|---|---|---|
| 2,605,079 | 7/1952 | Miller | 251—31 XR |
| 2,725,896 | 12/1955 | Barker | 137—625.48 XR |
| 2,782,801 | 2/1957 | Ludwig | 137—625.48 |
| 2,940,461 | 6/1960 | Binford | 251—31 XR |
| 3,122,154 | 2/1964 | Siebel | 251—324 |
| 3,191,628 | 6/1965 | Kirkwood. | |
| 3,240,466 | 3/1966 | Keyer | 251—31 |

FOREIGN PATENTS

| | | |
|---|---|---|
| 1,056,729 | 10/1953 | France. |

WILLIAM F. O'DEA, *Primary Examiner.*

W. H. WRIGHT, *Assistant Examiner.*

U.S. Cl. X.R.

251—31